(12) United States Patent
Toney et al.

(10) Patent No.: US 10,061,387 B2
(45) Date of Patent: Aug. 28, 2018

(54) METHOD AND APPARATUS FOR PROVIDING USER INTERFACES

(75) Inventors: Aaron Toney, Issaquah, WA (US); Sean White, Los Angeles, CA (US); Kenneth McClure, Dallas, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 1015 days.

(21) Appl. No.: 13/077,281

(22) Filed: Mar. 31, 2011

(65) Prior Publication Data
US 2012/0249409 A1 Oct. 4, 2012

(51) Int. Cl.
G06F 3/01 (2006.01)
G06F 1/16 (2006.01)
G06F 3/042 (2006.01)

(52) U.S. Cl.
CPC .............. G06F 3/017 (2013.01); G06F 1/163 (2013.01); G06F 3/0426 (2013.01)

(58) Field of Classification Search
CPC ............ G09G 5/00; G06F 3/033; G08B 23/00
USPC ........ 345/177, 168, 173, 156, 863; 715/863; 340/573.1
See application file for complete search history.

(56) References Cited

U.S. PATENT DOCUMENTS

| | | | |
|---|---|---|---|
| 6,771,294 B1 * | 8/2004 | Pulli | G06F 3/011 345/173 |
| 2003/0174125 A1 * | 9/2003 | Torunoglu et al. | 345/168 |
| 2004/0095311 A1 * | 5/2004 | Tarlton et al. | 345/156 |
| 2010/0199232 A1 * | 8/2010 | Mistry et al. | 715/863 |
| 2011/0007035 A1 * | 1/2011 | Shai | 345/179 |
| 2011/0133934 A1 * | 6/2011 | Tan et al. | 340/573.1 |
| 2011/0221672 A1 * | 9/2011 | Osterhout et al. | 345/156 |

FOREIGN PATENT DOCUMENTS

| WO | WO 2008/038096 A1 | 4/2008 |
|---|---|---|
| WO | WO 2009/143878 A1 | 12/2009 |
| WO | WO 2011/068632 A2 | 6/2011 |

OTHER PUBLICATIONS

International Search Report and Written Opinion from International Application No. PCT/IB2012/051463 dated Sep. 17, 2012.

(Continued)

*Primary Examiner* — Benjamin C Lee
(74) *Attorney, Agent, or Firm* — Alston & Bird LLP

(57) ABSTRACT

An apparatus, method, and computer program product are provided for generating a projected user interface. The apparatus may include at least one processor and at least one memory including computer program code. The at least one memory and the computer program code may be configured, with the processor, to cause the apparatus to receive information regarding a detected position of the user's body and to determine whether the detected position is an activation position, in which case the projection of a user interface may be provided. The user interface may be projected on an area on the user's body, such as a hand or a forearm, or on the surface of an object. The activation position may thus be a predefined position of the user's body in which effective projection of the user interface onto the surface and user interaction with the user interface is facilitated.

19 Claims, 10 Drawing Sheets

(56) References Cited

OTHER PUBLICATIONS

Next Generation iPhone Concept by Samuel Lee Kwon « FGadgets [online] [retrieved Mar. 28, 2011]. Retrieved from the Internet: <URL: http://fgadgets.com/future-gadgets/next-generation-iphone-concept-by-samuel-lee-kwon>. 6 pages.
LG Projector Phone is Like a Media-Throwing Web Shooter [retrieved Mar. 28, 2011]. Retrieved from the Internet: <URL: http://uk.gizmodo.com/5022626/lg-projector-phone-is-like-a-media+throwing-web-shooter>. 1 page.
YouTube—Skinput: Appropriating the Body as an Input Surface (CHI 2010) [retrieved May 5, 2011]. Retrieved from the Internet: <URL: http://www.youtube.com/watch?v=g3XPUdW9Ryg>. 1 pages.
YouTube—Natural User Interfaces with Physiological Sensing [retrieved May 5, 2011]. Retrieved from the Internet: <URL: http://www.youtube.com/watch?v=BYf3_SKi0PA>. 1 page.
Does science need a 'Sixth Sense'? | saybit.com [retrieved May 5, 2011]. Retrieved from the Internet: <URL: http://www.saybit.com/Saybit-Library/Blogs/Does-science-need-a-Sixth Sense>. 2 pages.
High Tech Bracelet to Turns Your Arm Into a Screen [online] [retrieved Mar. 6, 2015]. Retrieved from the Internet: <URL: http://www.mbtmag.com/videos/2014/12/high-tech-bracelet-turns-your-arm-screen?et_cid=4325994&et_rid=652324478&type=image>. (dated Dec. 18, 2014) 9 pages.

\* cited by examiner

METHOD AND APPARATUS FOR PROVIDING USER INTERFACES

TECHNOLOGICAL FIELD

Embodiments of the present invention relate generally to providing user interfaces on various surfaces, including surfaces on a user's body. In particular, embodiments of the present invention relate to an apparatus and method for activating and deactivating such user interfaces based on the user's body position.

BACKGROUND

The information age has made information available to users through various wired and wireless networks on many different types of devices from built-in speakers in a home theater system to laptop computers to cellular telephones. Along with the increased availability of information, however, has come increased user demand for accessibility of information. Users want to be provided with information quickly and seamlessly and want to expend as little effort as possible to access the information.

Accordingly, it may be desirable to provide an improved mechanism by which a user may interact with devices to view information and provide user input.

BRIEF SUMMARY OF EXAMPLE EMBODIMENTS

An apparatus is therefore provided that allows a user to view information and provide user input to the apparatus using a projected user interface that is activated and/or deactivated in response to the position of a part of the user's body. The apparatus may include at least one processor and at least one memory including computer program code. The at least one memory and the computer program code may be configured to, with the processor, cause the apparatus to at least receive information regarding a detected position of at least part of a user's body, determine whether the detected position comprises an activation position, and provide for projection of a user interface onto a surface in response to the determination that the detected position comprises the activation position. The activation position may be a predefined position (or range of positions) of the part of the user's body in which effective projection of the user interface onto the surface and user interaction with the user interface is facilitated.

In some cases, causing the apparatus to receive information regarding the detected position may comprise causing the apparatus to receive information regarding a relative position of at least two sensors with respect to each other. In other cases, causing the apparatus to receive information regarding the detected position may comprise causing the apparatus to receive information regarding a physiological measurement, or causing the apparatus to receive information regarding a position of a predetermined part of the user's body with respect to a predefined point on the user's body. The memory and computer program code may be further configured to, with the processor, cause the apparatus to receive an input from the user confirming that activation of the user interface is desired. Thus, the projection of the user interface may be provided in response to the determination that the detected position comprises the activation position and receipt of the input.

The activation position may be different positions in different contexts. For example, the activation position may comprise a position in which a backside of the user's hand is disposed proximate the user's forearm such that projection of the user interface onto the backside of the user's hand from a source disposed on the user's forearm is facilitated. In other cases, the activation position may comprise a position in which a palm of the user's hand is disposed proximate an underside of the user's forearm such that projection of the user interface from a source disposed on the underside of the user's forearm onto the palm of the user's hand is facilitated. In still other cases, the activation position may comprise a position in which at least one finger of the user's hand is disposed proximate the user's palm such that projection of the user interface onto the palm of the user's hand from a source disposed on one of the user's fingers is facilitated. Furthermore, the activation position may comprise at least two positions achieved in succession.

In some cases, the surface upon which the projection is provided may comprise a surface of an object. In others, the surface upon which the projection is provided may comprise a surface of the user's body. The memory and computer program code may be further configured to, with the processor, cause the apparatus to discontinue the projection of the user interface onto the surface when the detected position is substantially different from the activation position.

In other embodiments, a method and a computer program product are provided that receive information regarding a detected position of at least part of a user's body, determine via a processor whether the detected position comprises an activation position, and provide for projection of a user interface onto a surface in response to the determination that the detected position comprises the activation position. The activation position may be a predefined position of the part of the user's body in which effective projection of the user interface onto the surface and user interaction with the user interface is facilitated.

In this regard, information regarding a relative position of at least two sensors disposed on the user's body with respect to each other may be received. Alternatively or additionally, information regarding a physiological measurement may be received, and/or information regarding a position of a predetermined part of the user's body with respect to a predefined point on the user's body may be received.

Determining whether the detected position comprises the activation position may comprise determining via a processor whether the detected position and the activation position have at least a predefined percentage in common. In addition, in some cases, the projection of the user interface onto the surface may be discontinued when the detected position is substantially different from the activation position.

In still other embodiments, an apparatus is provided that includes means for receiving information regarding a detected position of at least part of a user's body, means for determining via a processor whether the detected position comprises an activation position, and means for providing for projection of a user interface onto a surface in response to the determination that the detected position comprises the activation position. The activation position may be a predefined position of the part of the user's body in which effective projection of the user interface onto the surface and user interaction with the user interface is facilitated.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 9:
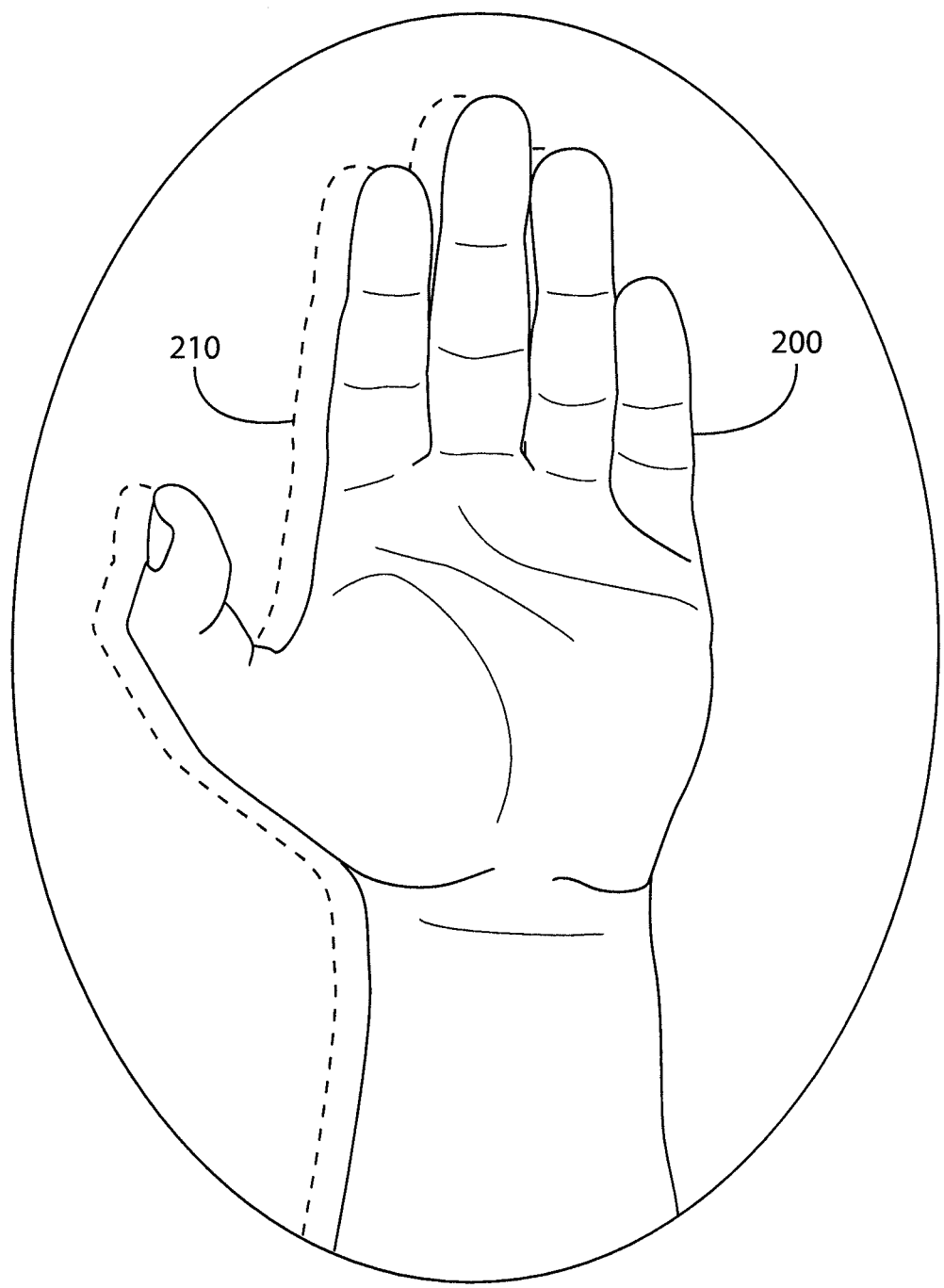
Figure 10:
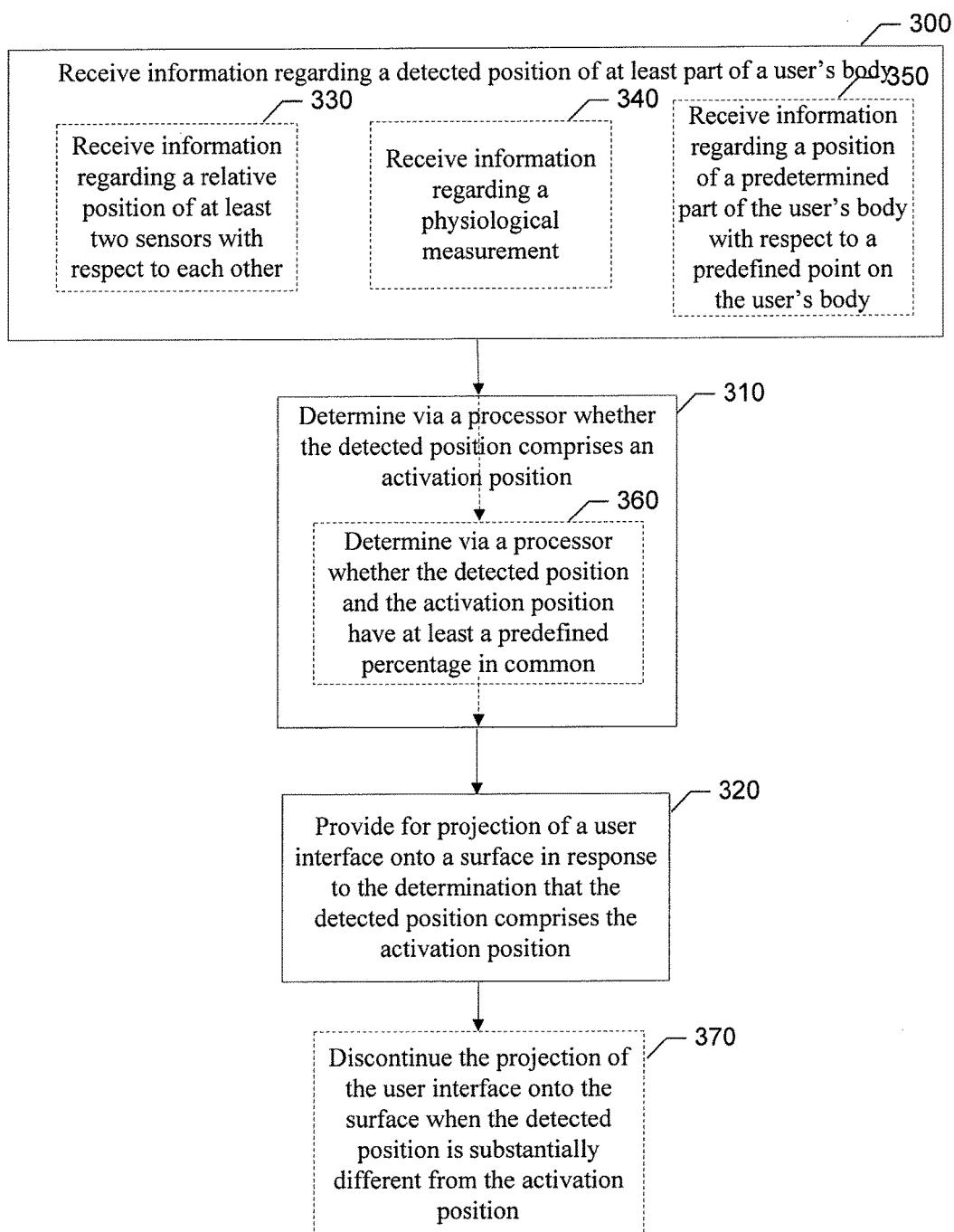

FIG. 9 illustrates an overlay of a detected position of a predetermined part of a user's body and the activation position in accordance with an example embodiment of the present invention; and FIG. 10 illustrates a flowchart of a method of providing a projected user interface that is activated and/or deactivated in response to a determination of a user's body position in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a physical storage medium (e.g., volatile or non-volatile memory device), can be differentiated from a "computer-readable transmission medium," which refers to an electromagnetic signal.

Devices for providing content to users are becoming smaller and smaller to allow greater portability and mobility to the user. In some cases, a user interface for displaying information and receiving inputs may be provided on a surface external to the device, in addition to or instead of a display surface provided on the device itself. For example, a device may project a user interface onto another surface, such as an object (e.g., a wall or a table), or even the user's body, and may receive the user's selections via that surface. For example, a device configured for projecting a user interface may be worn on a user's forearm (e.g., similar to a bracelet or a watch), upper arm (e.g., similar to an arm band), or finger (e.g., similar to a ring), as described in greater detail below.

In many cases, the user may not find it desirable to have the user interface projected (i.e., displayed) at all times. The user may not want to waste the battery life of the projecting device or risk having an incidental touch or gesture in the vicinity of the projected user interface misinterpreted as an input. Rather, the user may wish to have the user interface projected only at certain times, such as when the user needs to look up a contact, place a phone call, access a certain application, etc. At the same time, however, the user may not want to physically interact with the projecting device to manually activate or deactivate the projection of the user interface, as such interaction may require the user to interrupt another activity to reach for the device or may require the device to be larger than otherwise necessary to provide a large enough surface to receive the user's manual activation, running into the same issues noted above.

Accordingly, embodiments of the apparatus, method, and computer program product described below provide for the activation and/or deactivation of a user interface in response to a determination of the user's body position.

Figure 1:
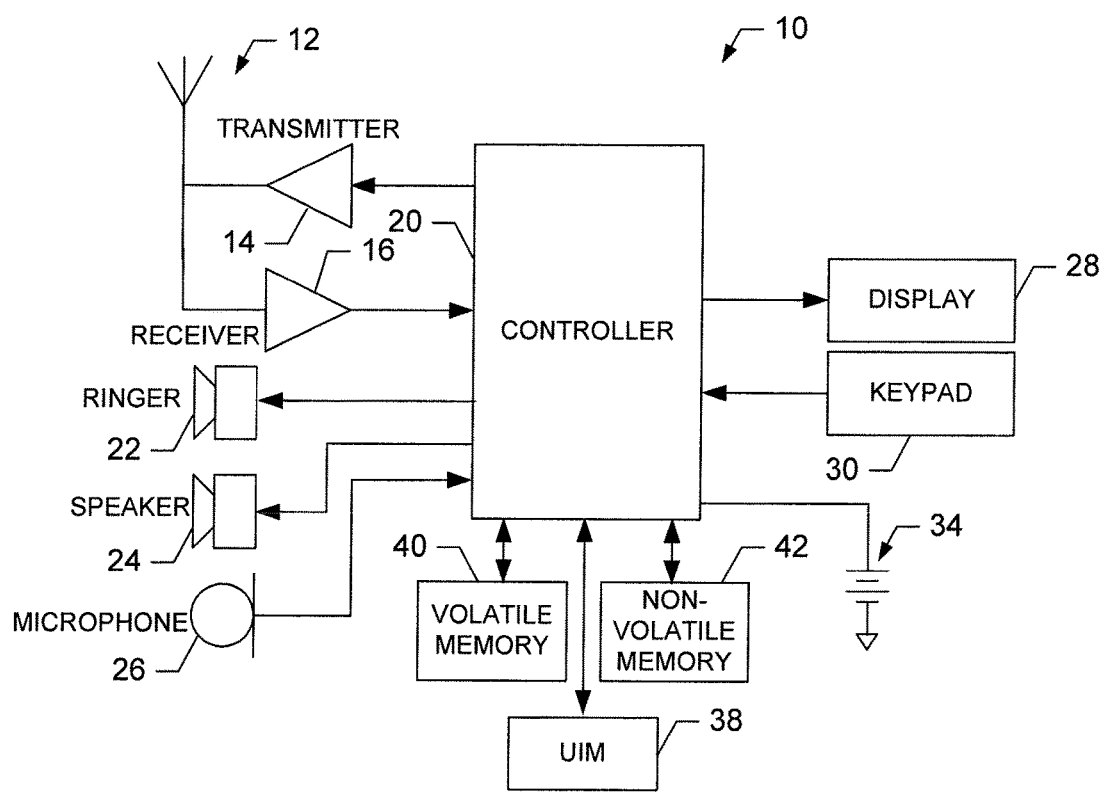
FIG. 1 illustrates one example of a communication system according to an example embodiment of the present invention.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a controller 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing a projected user interface are depicted. The apparatus 50 of FIG. 2 may be employed, for example, in conjunction with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
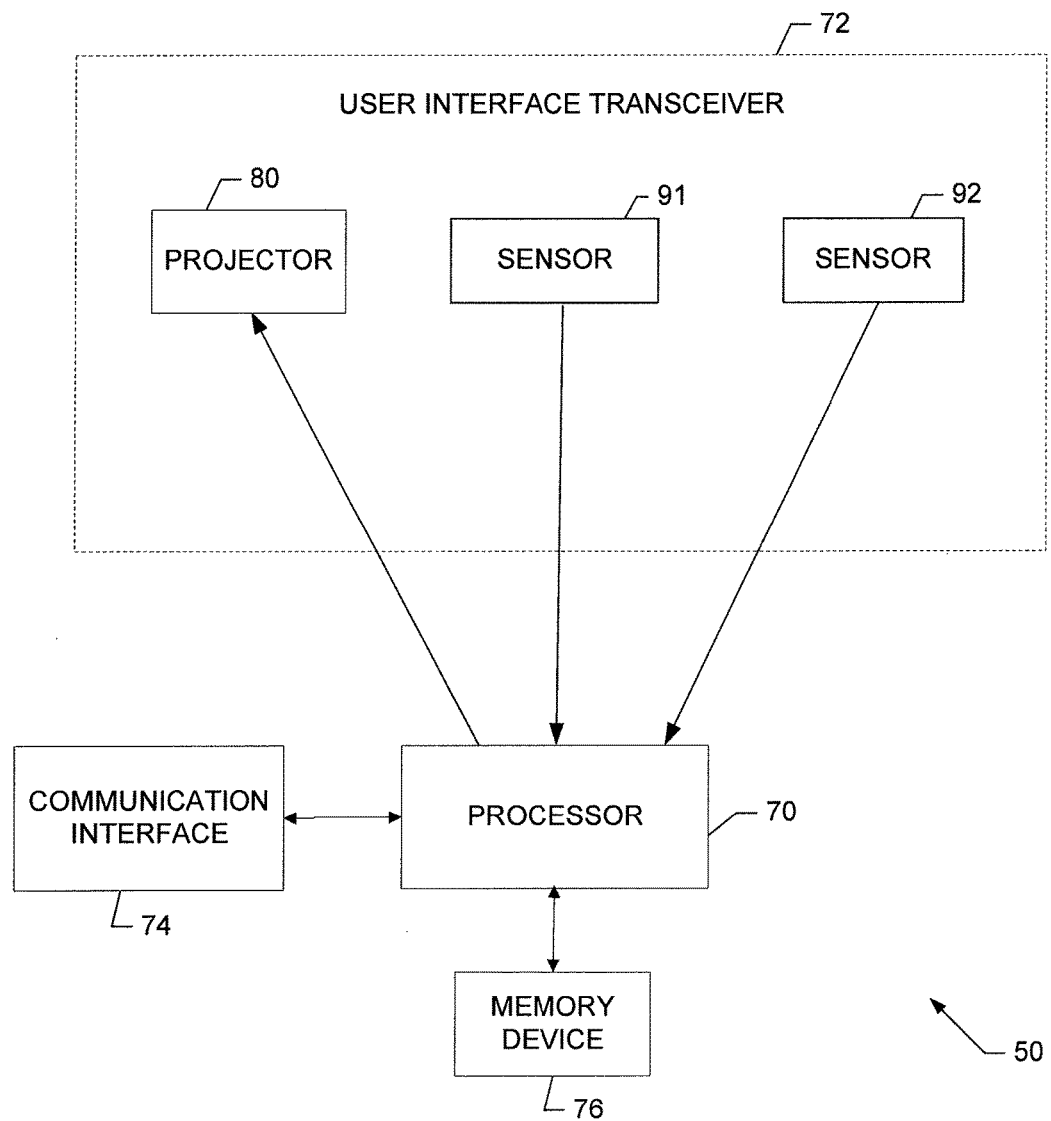
FIG. 2 illustrates a schematic block diagram of an apparatus for providing a projected user interface that may be activated and/or deactivated in response to a determination of a user's body position according to an example embodiment of the present invention.

It should also be noted that while FIG. 2 illustrates one example of a configuration of an apparatus for providing a projected user interface that may be activated and/or deactivated in response to a determination of a user's body position, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for providing a projected user interface may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. In exemplary embodiments described below, an image of a user interface may be projected on a surface external to the apparatus 50, such as on an object (a wall, a table, etc.), or a portion of the user's body, and information in the form of input from the user may be received via interaction with the projected user interface. As such, the user interface transceiver 72 may include, for example, a projector 80 configured to generate the projection of the user interface on a surface.

The projector 80 may project the user interface in several different ways. For example, the projector 80 may use a masked LED (light emitting diode) to accomplish projection by overlaying an LED with a simple masking structure (e.g., fixed or seven segment) so that the light projected by the LED beyond the mask is projected. Alternatively, the projector 80 may be configured to generate the image through laser drawing. Furthermore, in some cases, the projector 80 may comprise a conventional small color projector.

The user interface transceiver 72 may also include one or more sensors 91, 92 configured to detect the user's interaction with the representation of the user interface, as described further below. Alternatively or additionally, the processor 70 may comprise user interface circuitry configured to control at least some functions of one or more elements of the user interface, such as, for example, the projector 80, a speaker, a ringer, a microphone, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

Thus, in an example embodiment, the apparatus 50 may be configured to project a user interface that simulates, for example, a touch screen display on a surface external to the apparatus via the projector 80 and/or the sensor(s) 91, 92. The processor 70 may be in communication with the sensors 91, 92, for example, to receive indications of user inputs associated with the projected touch screen display (i.e., the projected user interface) and to modify a response to such indications based on corresponding user actions that may be inferred or otherwise determined responsive to the indications.

The projector 80 may, in some instances, be a portion of the user interface transceiver 72. However, in some alternative embodiments, the projector 80 may be embodied as the processor 70 or may be a separate entity controlled by the processor 70. For example, as shown in FIGS. 3-6, the projector 80 may be included or otherwise form a part of a bracelet, an arm band, and/or a ring worn by the user. The processor 70 may be co-located or integrally formed with the projector 80. For example, the mobile terminal 10 (FIG. 1) may be embodied in the bracelet, arm band, or ring and may include both the processor 70 and the projector 80 in some cases. Alternatively, the processor may be embodied in a separate device in communication with the projector and the sensors 91, 92, such as when the projector 80 is a peripheral device to a mobile terminal 10 (FIG. 1). Likewise, and as described in greater detail below with reference to FIGS. 4 and 5, one or more sensors 91, 92 may be co-located with the projector 80 and/or the processor 70, and/or embodied in one or more separate devices, such as devices disposed at various locations on the user's body. As such, in some embodiments, the processor 70 may be said to cause, direct, or control the execution or occurrence of the various functions attributed to the user interface transceiver 72 (and any components of the user interface transceiver 72) as described herein.

The user interface transceiver 72 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the user interface transceiver 72 as described herein. Thus, in examples in which software is employed, a device or circuitry (e.g., the processor 70 in one example) executing the software forms the structure associated with such means.

Figure 3:
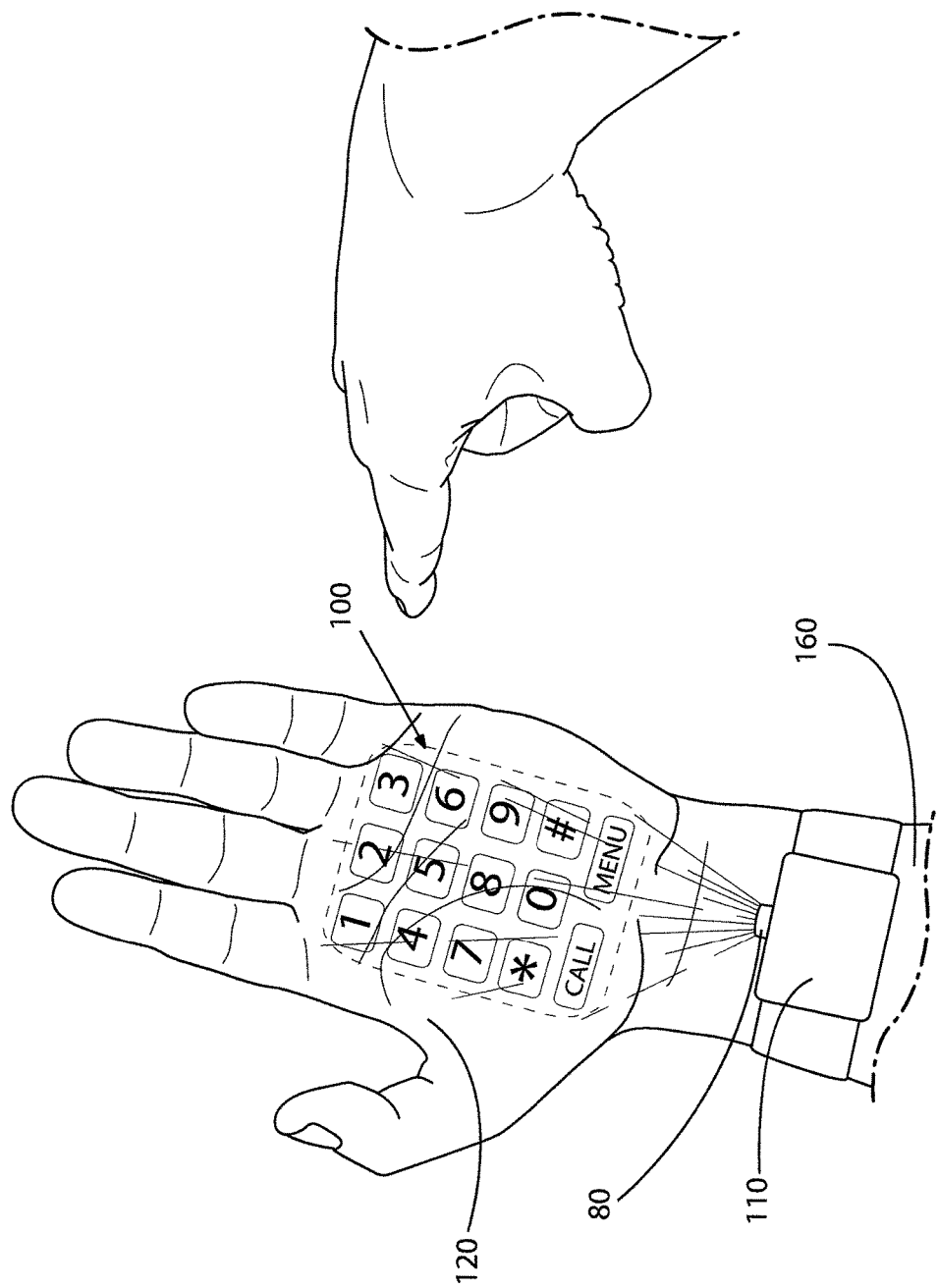
FIG. 3 illustrates a user interface that is projected onto the palm of a user's hand in accordance with an example embodiment of the present invention.
Figure 4:
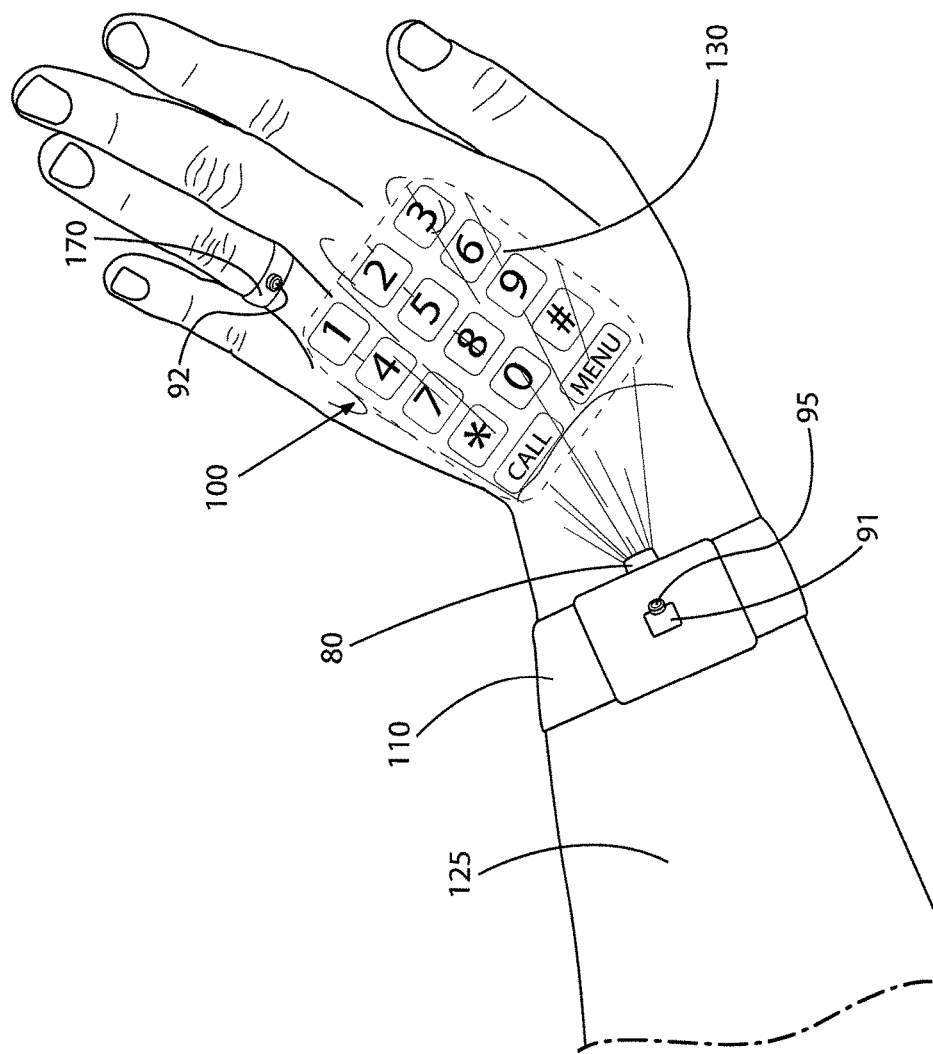
FIG. 4 illustrates a user interface that is projected onto the backside of a user's hand in accordance with an example embodiment of the present invention.
Figure 5:
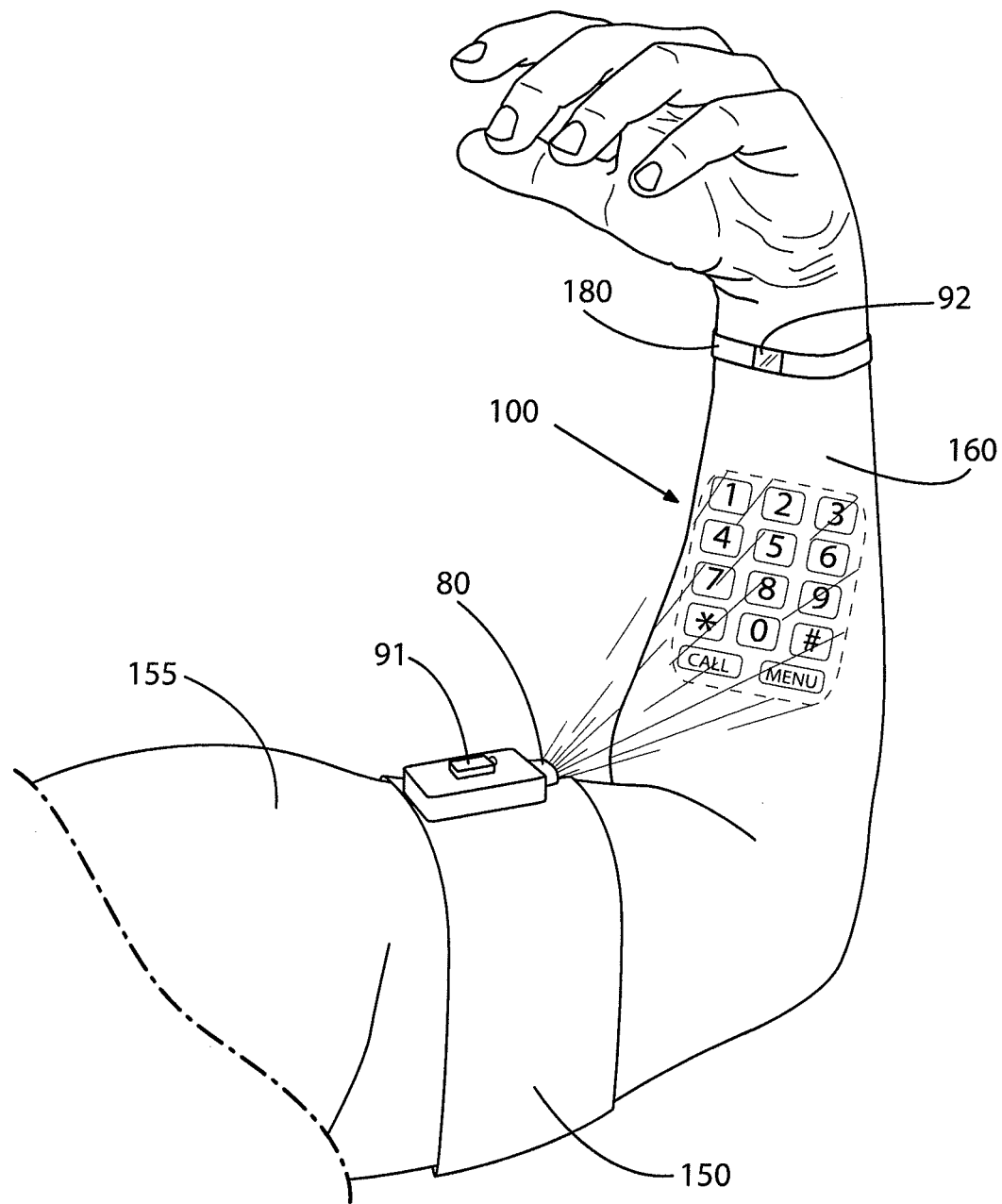
FIG. 5 illustrates a user interface that is projected onto the underside of a user's forearm in accordance with an example embodiment of the present invention.

The user interface transceiver 72 may be configured to receive an indication of an input in the form of a touch event at the projected user interface 100 (shown in FIGS. 3-6, for example). In FIGS. 3-6, a user interface 100 comprising numerical icons is projected onto a surface of the user's body, such as a hand (FIGS. 3, 4, and 6) or the underside of a forearm (FIG. 5). In such cases, a touch event, such as a finger tapping on the skin, creates acoustic signals in the form of transverse and longitudinal wave forms that are propagated through the body. Thus, the one or more sensors 91, 92 may be configured as a bioacoustic sensing array to capture these signals. The acoustic signals are in turn processed, taking into account, for example, variations in bone density, size, and mass and the effects of soft tissues and joints. In this way, the processor 70 may classify the touch events and translate them into useful indications of user input. The processor 70 may further modify a response to such indications based on corresponding user actions that may be inferred or otherwise determined responsive to the indications. Following recognition of a touch event, the user interface transceiver 72 may be configured provide a corresponding function based on the touch event in some situations.

In this regard, a touch may be defined as a touch event that impacts a single area (without or with minimal movement on the surface upon which the user interface 100 is projected) and then is removed. A multi-touch may be defined as multiple touch events sensed at the same time (or nearly the same time). A stroke event may be defined as a touch event followed immediately by motion of the object initiating the touch event (e.g., the user's finger) while the object remains in contact with the projected user interface 100. In other words, the stroke event may be defined by motion following a touch event, thereby forming a continuous, moving touch event defining a moving series of instantaneous touch positions (e.g., as a drag operation or as a flick operation). Multiple strokes and/or touches may be used to define a particular shape or sequence of shapes to define a character. A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other.

In some embodiments, the projected user interface 100 may also be configured to enable the detection of a hovering gesture input. A hovering gesture input may comprise a gesture input to the touch display (e.g., the projected user interface) without making physical contact with a surface of the touch display, such as a gesture made in a space some distance above/in front of the surface upon which the touch display is projected. As an example, the projected user interface 100 may comprise a projected capacitive touch display, which may be configured to enable detection of capacitance of a finger or other input object by which a gesture may be made without physically contacting the display surface (e.g., the user's skin, as described below). As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

Figure 8:
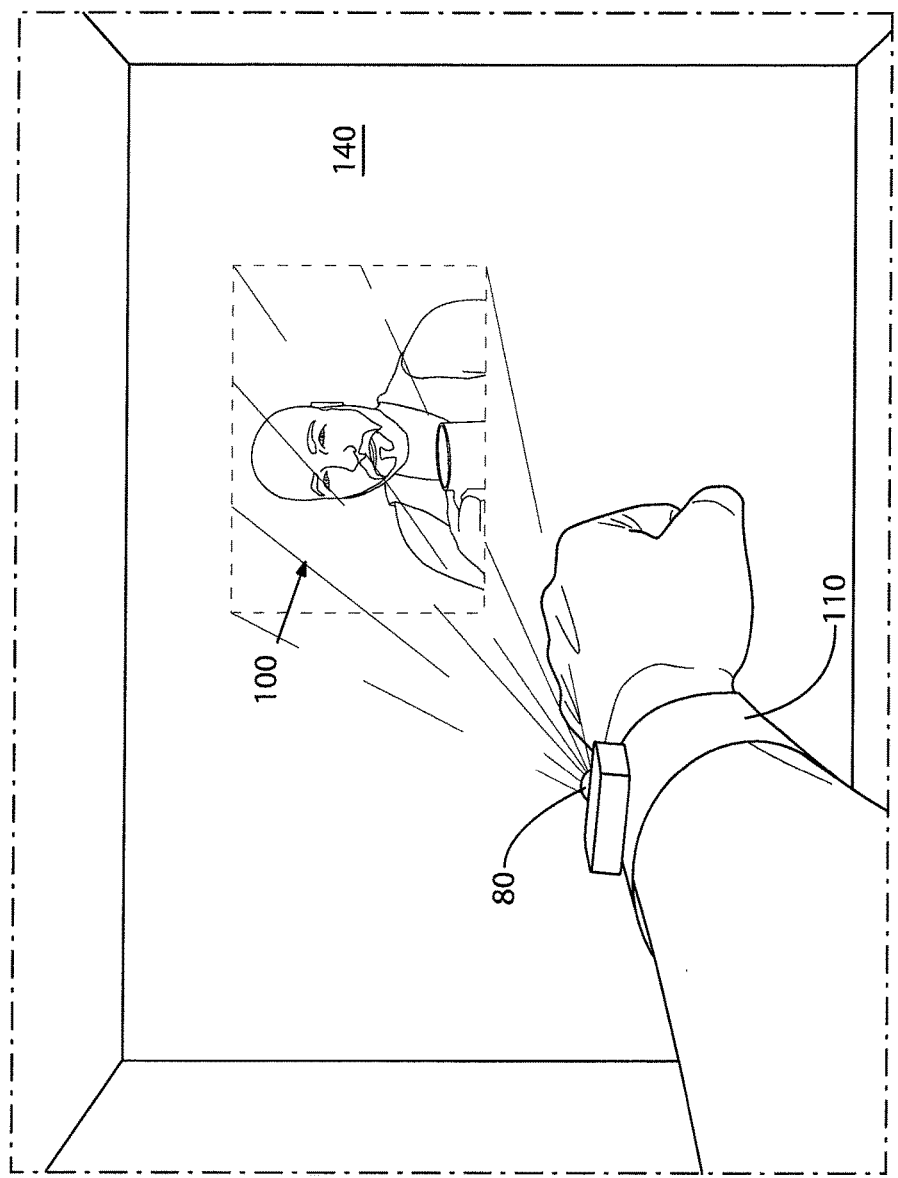
FIG. 8 illustrates a user interface that is projected onto a wall in accordance with an example embodiment of the present invention.

Turning now to FIGS. 3-6, various embodiments of the apparatus 50 are shown in which the projector 80 is configured to generate an image of the user interface on an area of the user's body. Although such user interfaces 100 may be projected on any body surface, from a practical standpoint, areas such as the user's arms and hands may provide adequate surface area for presenting the user interface and may further be accessible to the user without requiring the user to, for example, remove articles of clothing. It is noted, however, that in some embodiments, the user interface 100 may be projected on the user's clothing or on a surface apart from the user's body, such as on a wall 140 (shown in FIG. 8), a table, a book, or the surface of any other object conducive to showing projected images.

As depicted in FIGS. 3 and 4, in some embodiments, the projector 80 may be embodied in a bracelet or watch 110 that is worn on the user's forearm proximate the wrist, for example, as part of a mobile terminal or other device embodied in the bracelet or watch. In FIG. 3, for example, the projector 80 is configured (e.g., sized and positioned) to project the user interface 100 on the palm 120 of the user's hand. In FIG. 4, the projector 80 is configured to project the user interface 100 on the backside 130 of the user's hand.

Figure 6:
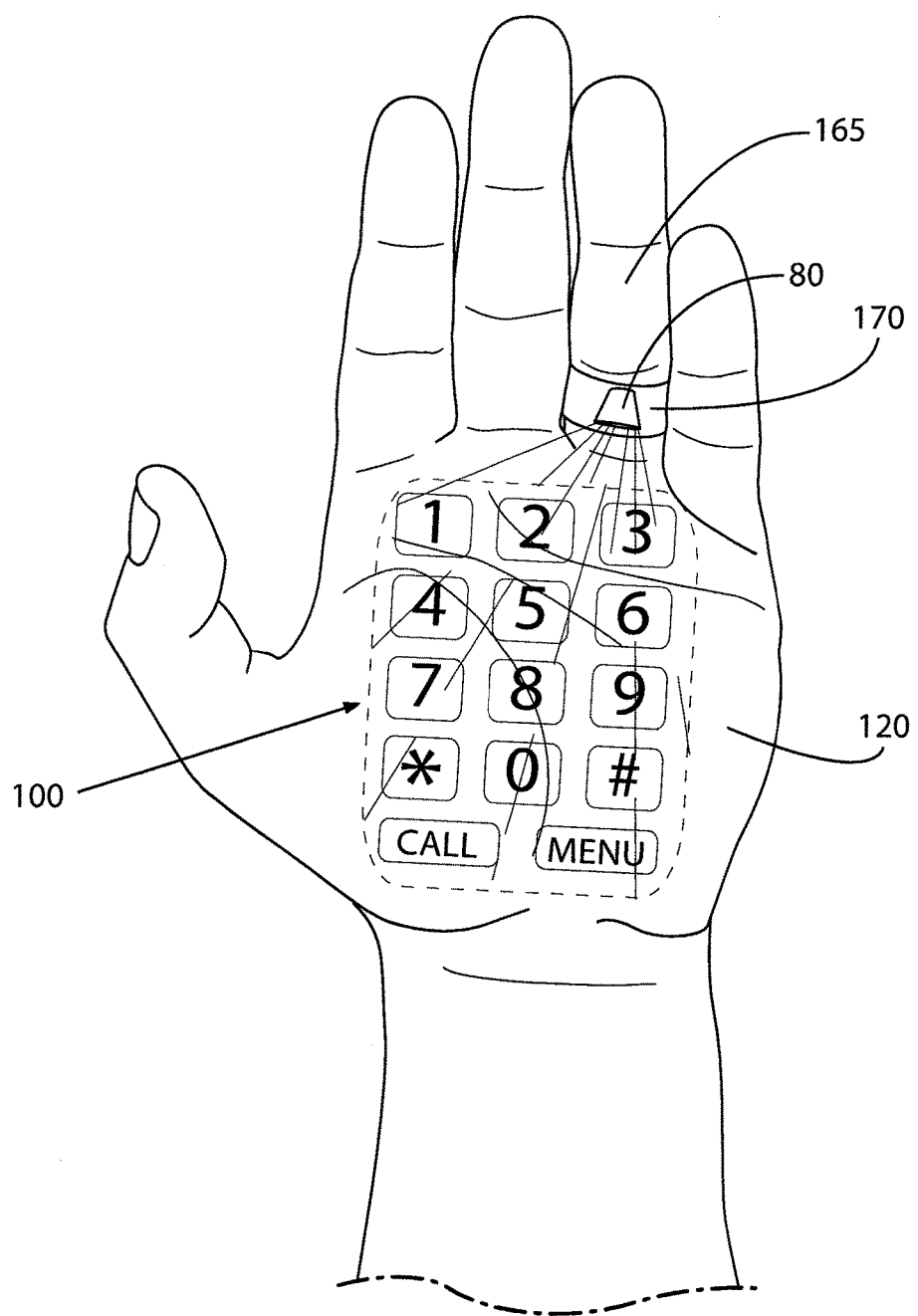
FIG. 6 illustrates a user interface that is projected onto the palm of a user's hand via a projector on a ring in accordance with an example embodiment of the present invention.

In FIG. 5, the projector 80 is embodied in an arm band 150 worn on the user's upper arm 155. The projector 80, in this case, is configured to project the user interface 100 on an underside 160 of the user's forearm, as shown. In still other embodiments, such as depicted in FIG. 6, the projector 80 may be embodied in a ring 170 worn on one of the user's fingers 165. The projector 80 may thus be configured to project the user interface 100 on the palm 120 of the user's hand.

As noted above, it may be undesirable to have the projector 80 continuously generating the image of the user interface 100. Accordingly, embodiments of the apparatus 50 provide for the activation and/or deactivation of the projected user interface in response to the detection of the user's body position. In particular, at least one memory (e.g., the memory device 76 of FIG. 2) including computer program code may be configured to, with the processor 70, cause the apparatus to receive information regarding a detected position of the user's body. The apparatus 50 may further be caused to determine whether the detected position comprises an activation position and to provide for projection of the user interface onto a surface (such as a surface of the user's body) in response to the determination that the detected position comprises the activation position. As described below in the context of different scenarios, the activation position may be associated with a predefined tolerance, such that a range of detected positions may achieve activation of the user interface. Put simply, the user may not have to achieve the activation position exactly to activate the user interface, but rather may have to move the predetermined part of his body to one of a range of positions that are recognized by the apparatus as approximating the activation position.

In this regard, the activation position may be a predefined position of the user's body in which effective projection of the user interface onto the surface and user interaction with the user interface is facilitated. In other words, the activation position may be a position of a part of the user's body in which the projection of the user interface is substantially free from obstruction, allowing the user to clearly view projected information and interact with the user interface such that the user's inputs can be properly processed. Such a position may, for example, orient the surface upon which the user interface is to be projected to be oriented at a predefined angle to the projector 80, such as an angle between approximately 60° and approximately 150°, or any other preset angle or range of angles (e.g., an angle set by the user). Similarly, the activation position may allow for the user's interaction with the user interface to be properly sensed, e.g., via sensors. Thus the activation position may further be a position of a part of the user's body that also takes into account the position of sensors.

For example, referring to FIG. 3, the activation position may comprise a position in which the palm 120 of the user's hand is disposed proximate the underside 160 of the user's forearm (e.g., bent at the wrist) such that projection of the user interface 100 from a source disposed on the underside of the user's forearm (e.g., the projector 80 on the bracelet 110) onto the palm of the user's hand is facilitated. Said differently, when the user desires to activate the user interface (e.g., switch on the projector 80), the user can assume the activation position by bending his hand at the wrist such that the palm 120 of the user's hand is facing the projector 80 and is in position to display the projected user interface 100.

For a projector 80 disposed at a different location on the user's body, such as on the user's forearm 125, as depicted in FIG. 4, the activation position may comprise a position in which the backside 130 of the user's hand is disposed proximate the user's forearm 125 such that projection of the user interface 100 onto the backside of the user's hand is facilitated. Thus, in this scenario, the user would assume the activation position by moving his hand and arm to a "stop" position (i.e., a gesture that may otherwise indicate to a person standing in front of the user to stop) such that the backside 130 of the user's hand is in position to display the projected user interface 100, as shown.

In still another example, depicted in FIG. 6, in which case the projector 80 is disposed on a ring 170 worn on the user's finger, the activation position may comprise a position in which of at least one of the user's fingers 165 is disposed proximate the user's palm 120 such that projection of the user interface 100 onto the palm of the user's hand from the ring is facilitated. In this case, the user may, for example, bend one or more of his fingers at the knuckles such that his fingers are relatively perpendicular to the palm 120 of his hand to assume the activation position, as shown.

In some embodiments, the activation position may comprise at least two positions achieved in succession. For example, the user may be required to move a predetermined part of his body first to one position, then to another position. The positions may need to be achieved in a particular order and/or within a preset window of time (e.g., within a time period of 5 seconds) in order for the apparatus to recognize the successive positions as comprising the activation position.

Figure 7:
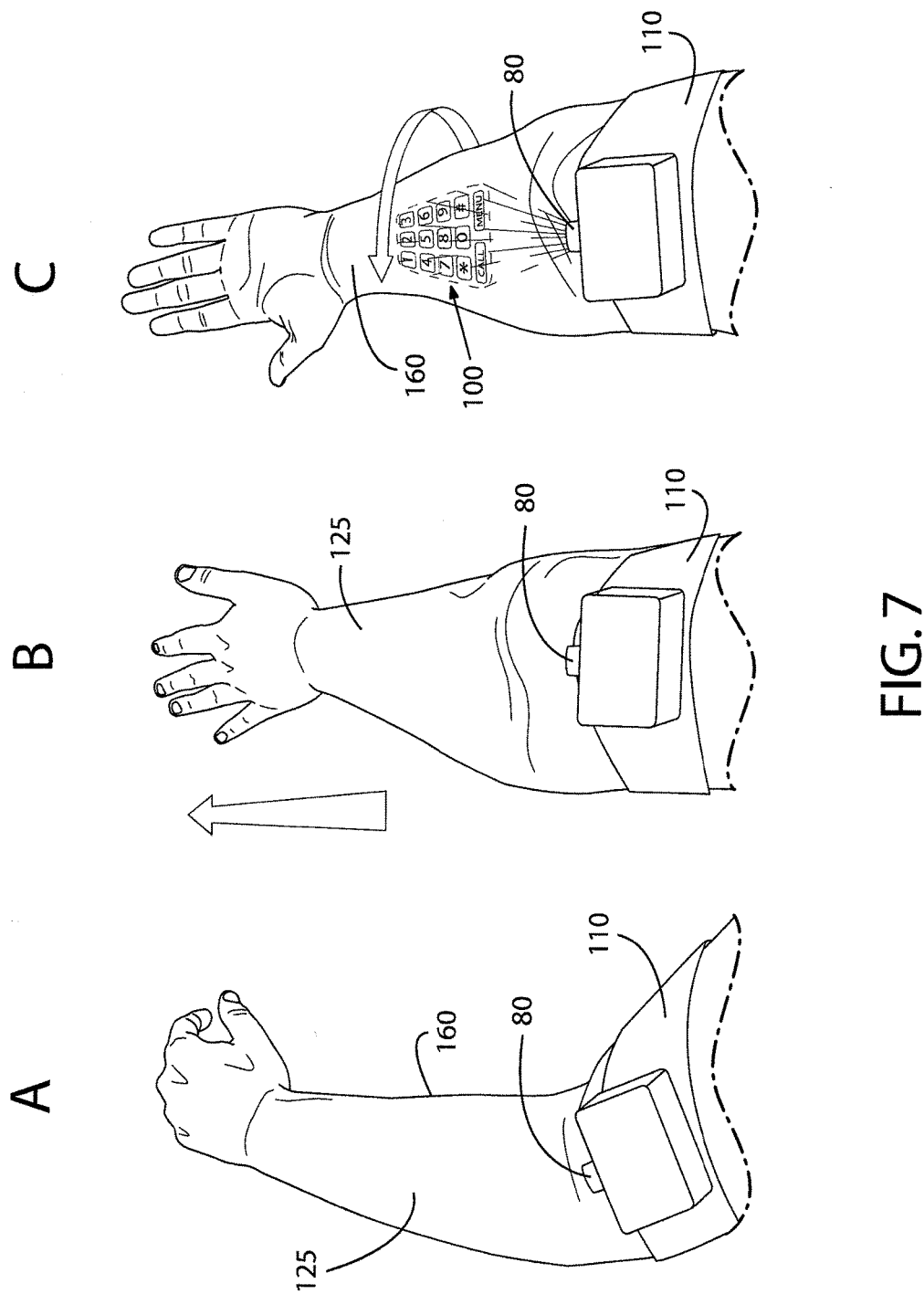
FIG. 7 illustrates a series of movements that may comprise the activation position in accordance with an example embodiment of the present invention.

For example, as depicted in FIG. 5, in which the projector 80 is disposed on the user's upper arm 155 and the user interface is projected onto the underside 160 of the user's forearm, the activation position may comprise, achieving a first position of the user's arm (e.g., by straightening the user's arm, as shown at B in FIG. 7) from an initial "at rest" position (A in FIG. 7) and then achieving a second position of the user's arm (e.g., by rotating the user's forearm 125 about the user's elbow, as shown at C in FIG. 7). Thus, upon completing the movement shown in C of FIG. 7, the underside 160 of the user's forearm 125 may be in position to effectively project the user interface 100 and to facilitate the receipt of user input through user interaction with the user interface.

In some cases, the memory and computer program code may be configured to, with the processor, cause the apparatus to receive an input from the user confirming that activation of the user interface is desired. Thus, the user interface may be projected in response to both the determination that the detected position comprises the activation position and receipt of the confirming input. For example, in the scenario depicted in FIG. 3, the user may move his hand to the activation position by bending his hand at the wrist to facilitate projection of the user interface onto his palm 120. The user may then provide an input to confirm that he wishes to activate the user interface by, for example, using a finger of his other hand to tap on his palm 120. As noted above, one or more sensors 91, 92 (shown in FIG. 4) may detect the impact of the tap, and the processor 70 may, in response to the activation position being achieved and the confirming input cause the projector 80 to project the user interface. By requiring an input from the user in addition to achieving the activation position, spurious activation of the user interface (e.g., in response to the user's incidental movement of his hand to the activation position, such as during the course of performing an unrelated activity) may be avoided.

In some embodiments, the memory and computer program code are further configured to, with the processor, cause the apparatus to receive information regarding the detected position of the user's body by receiving information regarding a relative position of at least two sensors with respect to each other. Referring to FIGS. 4 and 5, for example, in FIG. 4, a first sensor 91 is provided on the bracelet 110 in which the projector 80 is embodied. A second sensor 92 is provided on a ring 170 worn on the user's finger. Each sensor 91, 92, in this case, may be configured to detect the position of the other sensor with respect to itself, for example, through the transmission and receipt of signals. Thus, in the example depicted in FIG. 4, as the second sensor 92 is moved closer to the first sensor 91 (e.g., as the user bends his hand at the wrist to move his hand to the "stop" position), information regarding the relative position of the two sensors (e.g., the distance between the two sensors) may be received by the apparatus. Once the sensors 91, 92 approach a certain distance, the apparatus may determine that the detected position is an activation position and may, in turn activate the projector 80 to provide for projection of the user interface onto the backside 130 of the user's hand.

Similarly, as shown in FIG. 5, a first sensor 91 may be provided on the arm band 150 in which the projector 80 is embodied, and a second sensor 92 may be disposed, for example, on a wrist band 180 proximate the user's wrist. Thus, as the user moves his arm to the activation position (e.g., in the succession of movements depicted in FIG. 7), the relative motion of the sensors 91, 92 with respect to each other may be detected (e.g., each detected by the other sensor) and such information may be transmitted by the sensors to the processor 70, which may, in turn, determine whether the activation position is attained.

In other embodiments, the memory 76 and computer program code may be configured to, with the processor 70, cause the apparatus to receive information regarding the detected position of the user's body by receiving information regarding a physiological measurement. For example, one or more of the sensors 91, 92 (shown in FIGS. 4 and 5) may be disposed against the user's skin and may be configured to measure the tendon or muscle pressure in the location of the sensor. As the user moves his body, the use of muscles and tendons in the vicinity of the sensor will cause the sensed pressure at the sensor to vary. Thus, as the user assumes a position approximating the activation position, the pressure measured by the sensor(s) may approach a predefined pressure corresponding to the activation position. Similarly, the sensor(s) 91, 92 may be configured to detect other physiological measurements indicative of the position and/or movement of the user's body, such as electrostatic signals and heat, among others.

In still other embodiments, one or more sensors 91, 92 may be configured to detect a predefined position of a certain part of the user's body. In this regard, the sensor(s) 91, 92 may include a camera 95 (shown in FIGS. 2 and 4) configured to send signals to the processor 70 regarding the position of a predetermined part of the user's body with respect to a predefined point on the user's body (e.g., the location of the camera 95). For example, the camera 95 depicted in FIG. 4, which may be part of the sensor 91, may be configured to capture images of the user's hand 190. Thus, when the user wishes to activate the user interface and moves his hand 190 to the activation position by bending his hand at the wrist, as shown, the camera 95 may send signals corresponding to the position of the user's hand to the processor 70 (FIG. 2), and the processor may determine if the hand is substantially in the activation position.

In this regard, the memory and computer program code may be configured to, with the processor, cause the apparatus to determine that the detected position comprises the activation position when the detected position and the activation position have at least a predefined percentage in common. For example, with reference to FIG. 9, the detected position 200 may be overlaid on the activation position 210, and the processor may be configured to determine the percentage in common between the two. The percentage in common may be defined by the manufacturer of the device or, in some cases, by the user and may be any percentage between 0% and 100% that results in the user interface being activated when the user requests activation and, at the same time avoids spurious activation of the user interface in response to movements of the predetermined part of the user's body that are not meant by the user to achieve the activation position. Thus, if the detected position 200 and the activation position 210 are within, for example, at least 85% of each other, the processor may determine that the activation position has been achieved and may provide for the projection of the user interface onto the designated surface. If, however, the detected position 200 and the activation position 210 have less than 85% in common in this example, the user interface may not be activated.

Similarly, in embodiments in which the relative positions of multiple sensors 91, 92 are detected or physiological measurements are taken, the detected values may be compared to predefined values corresponding to values achieved in the activation position, and the user interface may only be projected when the detected values are within 85% or more of the activation values.

The memory 76 and computer program code may further be configured to, with the processor, cause the apparatus 50 to discontinue the projection of the user interface onto the surface (e.g., an area of the user's skin) when the detected position is substantially different from the activation position. For example, if the user moves his body such that a muscle pressure detected by a sensor 91, 92 is no longer within a predefined range of pressures corresponding to the muscle pressure in the activation position, the processor may direct the projector 80 to deactivate the user interface.

Similarly, if the detected position 200 no longer approximates the activation position 210 in the embodiment shown in FIG. 9 (based on the predefined percentage in common, for example), or if the relative position of two or more sensors 91, 92 has changed from the activation position, the user interface may likewise be deactivated.

In some cases, the user may further be required to provide an input confirming his desire to deactivate the user input, in addition to changing the position of the predetermined part of his body. For example, referring to FIG. 3, in addition to straightening out his hand so that his palm 120 is no longer positioned as depicted in FIG. 3, the user may also be required to provide an input, such as a tap or series of taps on his palm or some other predetermined part of his body to confirm that he wishes to deactivate the user interface. The confirming input may be made before the detected position is substantially altered from the activation position or after, depending on user preferences and/or system settings.

FIG. 10 is a flowchart of a system, method, and computer program product according to example embodiments of the invention. It will be understood that each block of the flowchart, and combinations of blocks in the flowchart, may be implemented by various means, such as hardware, firmware, processor, circuitry, and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method for providing for the projection of a user interface, as shown in FIG. 10, includes receiving information regarding a detected position of at least part of a user's body at operation 300. A determination may be made via a processor (e.g., processor 70 of FIG. 2) as to whether the detected position comprises an activation position (at operation 310), and the projection of a user interface onto a surface may be provided in response to the determination that the detected position comprises the activation position (at operation 320). The activation position may be a predefined position of at least part of the user's body in which effective projection of the user interface onto the surface and user interaction with the user interface is facilitated, as described above.

Receiving information may include receiving information regarding a relative position of at least two sensors disposed on the user's body with respect to each other, e.g., at operation 330. Alternatively, receiving information may include receiving information regarding a physiological measurement (at operation 340), or receiving information regarding a position of a predetermined part of the user's body with respect to a predefined point on the user's body (at operation 350).

In some cases, the determination of whether the detected position comprises the activation position may include determining via a processor whether the detected position and the activation position have at least a predefined percentage in common, at operation 360. Furthermore, at operation 370, the projection of the user interface onto the surface may be discontinued when the detected position is substantially different from the activation position.

In some embodiments, certain ones of the operations above may be modified or further amplified as described below. Furthermore, in some embodiments, additional optional operations may be included, some examples of which are shown in dashed lines in FIG. 10. Modifications, additions, or amplifications to the operations above may be performed in any order and in any combination.

In an example embodiment, an apparatus for performing the method of FIG. 10 above may comprise a processor (e.g., the processor 70) configured to perform some or each of the operations (300-370) described above. The processor may, for example, be configured to perform the operations (300-370) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310 and 360 may comprise, for example, the processor 70 and/or a device or circuit for executing instructions or executing an algorithm for processing information as described above. Examples of means for performing operations 300, 320-350, and 370 may comprise, for example, the processor 70, the user interface transceiver 72, and/or a device or circuit for executing instructions or executing an algorithm for processing information as described above.

Although the description and associated figures provide examples of a user interface comprising numerical icons that may be used, for example, to initiate a telephone call, numerous other user interfaces and images may be projected. For example, in FIG. 8, the projected user interface 100 comprises a streaming video, which may be a movie or the image of a person with whom the user is conducting a video conference, for example. In other examples, the projected user interface may be a game, a list of contacts, an internet website, or numerous other applications, which may or may not require input from the user. For example, in the case of a movie that is projected for the user's viewing, the user interface may not provide any buttons for soliciting input from the user while the movie is showing. The user may, however, cause the movie to be paused by tapping on the projected user interface or disrupting the projected light forming the user interface on the surface (e.g., projected on the wall as in FIG. 8), or the user's interaction may cause a menu to appear that would allow the user to provide various types of input via the projected user interface.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   receive at the processor information from a first sensor regarding a position of the first sensor, wherein the first sensor is embodied by a device comprising a projector and is disposed on a user's body;
   receive at the processor information from a second sensor regarding a position of the second sensor, wherein the second sensor is disposed on the user's body and is spaced from the first sensor;
   determine the position of the first sensor with respect to the position of the second sensor so as to determine a detected position of at least part of the user's body;
   determine whether the detected position comprises an activation position; and
   provide for activation of the projector to project a user interface onto a surface in response to the determination that the detected position comprises the activation position,
   wherein the activation position is a predefined position of the part of the user's body in which effective projection of the user interface onto the surface and user interaction with the user interface is facilitated.

2. The apparatus of claim 1, wherein the memory and computer program code are further configured to, with the processor, cause the apparatus to receive an input from the user confirming that activation of the user interface is desired, wherein the projection of the user interface is provided in response to the determination that the detected position comprises the activation position and receipt of the input.

3. The apparatus of claim 1, wherein the activation position comprises a position in which a backside of the user's hand is disposed proximate the user's forearm such that projection of the user interface onto the backside of the user's hand from a source disposed on the user's forearm is facilitated.

4. The apparatus of claim 1, wherein the activation position comprises a position in which a palm of the user's hand is disposed proximate an underside of the user's forearm such that projection of the user interface from a source disposed on the underside of the user's forearm onto the palm of the user's hand is facilitated.

5. The apparatus of claim 1, wherein the activation position comprises a position in which at least one finger of the user's hand is disposed proximate the user's palm such that projection of the user interface onto the palm of the user's hand from a source disposed on one of the user's fingers is facilitated.

6. The apparatus of claim 1, wherein the activation position comprises at least two positions achieved in succession.

7. The apparatus of claim 1, wherein the surface upon which the projection is provided comprises a surface of an object.

8. The apparatus of claim 1, wherein the surface upon which the projection is provided comprises a surface of the user's body.

9. The apparatus of claim 1, wherein the memory and computer program code are further configured to, with the processor, cause the apparatus to discontinue the projection of the user interface onto the surface when the detected position is substantially different from the activation position.

10. A method comprising:
    receiving at a processor information from a first sensor regarding a position of the first sensor, wherein the first sensor is embodied by a device comprising a projector and is disposed on a user's body;
    receiving at the processor information from a second sensor regarding a position of the second sensor, wherein the second sensor is disposed on the user's body and is spaced from the first sensor;
    determining the position of the first sensor with respect to the position of the second sensor so as to determine a detected position of at least part of the user's body;
    determining via the processor whether the detected position comprises an activation position; and
    providing for activation of the projector to project a user interface onto a surface in response to the determination that the detected position comprises the activation position,
    wherein the activation position is a predefined position of the part of the user's body in which effective projection of the user interface onto the surface and user interaction with the user interface is facilitated.

11. The method of claim 10, wherein determining whether the detected position comprises the activation position comprises determining via a processor whether the detected position and the activation position have at least a predefined percentage in common.

12. The method of claim 10 further comprising discontinuing the projection of the user interface onto the surface when the detected position is substantially different from the activation position.

13. A computer program product comprising at least one non-transitory computer-readable storage medium having computer-executable program code portions stored therein, the computer-executable program code portions comprising program code instructions for:
    receiving at a processor information from a first sensor regarding a position of the first sensor, wherein the first sensor is embodied by a device comprising a projector and is disposed on a user's body;

receiving at the processor information from a second sensor regarding a position of the second sensor, wherein the second sensor is disposed on the user's body and is spaced from the first sensor;

determining the position of the first sensor with respect to the position of the second sensor so as to determine a detected position of at least part of the user's body;

determining whether the detected position comprises an activation position; and providing for activation of the projector to project a user interface onto a surface in response to the determination that the detected position comprises the activation position, wherein the activation position is a predefined position of the part of the user's body in which effective projection of the user interface onto the surface and user interaction with the user interface is facilitated.

14. The computer program product of claim 13, wherein the program code instructions for determining whether the detected position comprises the activation position include instructions for determining whether the detected position and the activation position have at least a predefined percentage in common.

15. The computer program product of claim 13, wherein the activation position comprises at least two positions achieved in succession.

16. The computer program product of claim 13, wherein the computer-executable program code portions further comprise program code instructions for discontinuing the projection of the user interface onto the surface when the detected position is substantially different from the activation position.

17. The computer program product of claim 13, the computer-executable program code portions further comprise program code instructions for receiving an input from the user confirming that activation of the user interface is desired, wherein the projection of the user interface is provided in response to the determination that the detected position comprises the activation position and receipt of the input.

18. The method of claim 10, wherein the activation position comprises at least two positions achieved in succession.

19. The method of claim 10 further comprising receiving an input from the user confirming that activation of the user interface is desired, wherein the projection of the user interface is provided in response to the determination that the detected position comprises the activation position and receipt of the input.

\* \* \* \* \*